(12) United States Patent
Liang et al.

(10) Patent No.: US 6,510,732 B1
(45) Date of Patent: Jan. 28, 2003

(54) METHOD FOR DETERMINING THE BALANCER CONDITION OF A BALANCED ENGINE

(75) Inventors: Paul N. Liang, Menomonee Falls, WI (US); Deane Jaeger, Delafield, WI (US)

(73) Assignee: Harley-Davidson Motor Company Group, Inc., Milwaukee, WI (US)

( * ) Notice: Subject to any disclaimer, the term of this patent is extended or adjusted under 35 U.S.C. 154(b) by 16 days.

(21) Appl. No.: 09/627,962

(22) Filed: Jul. 28, 2000

(51) Int. Cl.$^7$ ............................................. G01M 15/00
(52) U.S. Cl. ..................... 73/117.3; 73/119 R
(58) Field of Search ................. 73/116, 117.2, 73/117.3, 118.1, 119 R, 66, 460, 468, 487

(56) References Cited

U.S. PATENT DOCUMENTS

| | | | | |
|---|---|---|---|---|
| 3,705,516 A | * | 12/1972 | Reis | |
| 4,010,637 A | * | 3/1977 | Harwell et al. | |
| 4,271,469 A | * | 6/1981 | Kawai et al. | |
| 4,370,964 A | * | 2/1983 | Muranaka et al. | |
| 4,607,602 A | * | 8/1986 | Komurasaki | |
| 4,895,121 A | * | 1/1990 | McCoy et al. | |
| 5,119,783 A | * | 6/1992 | Komurasaki | |
| 5,190,011 A | * | 3/1993 | Hashimoto et al. | |
| 5,214,960 A | * | 6/1993 | Tsuboi | |
| 5,537,967 A | * | 7/1996 | Tashiro et al. | |
| 5,608,633 A | * | 3/1997 | Okada et al. | |
| 5,777,228 A | * | 7/1998 | Tsuboi et al. | |
| 5,907,098 A | * | 5/1999 | Tsuboi et al. | |
| 6,105,552 A | * | 8/2000 | Arisawa et al. | |
| 6,289,735 B1 | * | 9/2001 | Dister et al. | |

* cited by examiner

*Primary Examiner*—Eric S. McCall
(74) *Attorney, Agent, or Firm*—Michael Best & Friedrich LLP

(57) ABSTRACT

A method and apparatus for determining the balanced condition of an engine having a balancer is provided. An engine balancer tester includes a sensor coupled to the engine. The engine generates first- and second-order vibrations that have vibration levels and the sensor generates a signal corresponding to the vibrations. A meter coupled to the sensor receives the signal and calculates a ratio between the vibration level of the first-order vibrations and the vibration level of the second-order vibrations. A comparator compares the ratio to a predetermined value to assess the balanced condition of the engine.

13 Claims, 2 Drawing Sheets

METHOD FOR DETERMINING THE BALANCER CONDITION OF A BALANCED ENGINE

FIELD OF THE INVENTION

The invention relates to the inspection of motor vehicle engines, and specifically to measuring the vibration of an engine having balancers.

BACKGROUND OF THE INVENTION

Internal combustion engines typically have at least one piston and connecting rod driving a crankshaft. As the engine operates, reciprocal motion of the piston is translated to rotational movement of the crankshaft. As a result of the reciprocating motion of the piston and connecting rod, engine operation typically generates vibrations of the engine and engine components. The vibration of greatest concern is normally the first-order vibration at a frequency determined by dividing the engine rpm by sixty. Sufficient vibration over a period of time, particularly at certain frequencies, can be uncomfortable for some riders.

Some engine manufacturers have attempted to dampen engine vibration by adding balancers within an engine. If correctly designed and installed, the balancers can counteract a significant portion of the engine vibration, resulting in more comfort to some riders.

SUMMARY OF THE INVENTION

If the balancers are slightly misaligned, the balancers can still dampen the engine vibrations, but the balancers will not function to the designed effectiveness. Because the balancers are located within the engine housing, it is difficult to determine whether the balancers are properly aligned. A diagnostic tool other than visual confirmation is desirable.

Prior art methods have sensed and compared first-order vibrations to determine balancer condition, but these methods cannot be used for engines installed in different motorcycle designs, experiencing different motorcycle conditions (e.g., motorcycle tire pressure), or installed on test stands. In other words, the results of these methods vary depending on the engine supporting structure.

The invention provides a method and apparatus for determining the balancer condition of a balanced engine, and is based on the recognition that the ratio of first-order vibration to second-order vibration is relatively independent of the engine supporting structure (e.g., whether the engine is mounted on a test stand or a motorcycle). In the present invention, the ratio of first-order to second-order vibrations of an operating test engine is calculated and compared to the ratio for an engine in which the balancers are properly aligned to determine whether the balancers in the test engine are properly aligned.

The invention described herein solves the problem of determining whether the balancers in an engine are properly aligned by providing a simple diagnostic tool that allows that determination to be made easily and quickly. The method can be used for engines installed in different motorcycle designs, experiencing different motorcycle conditions (e.g., motorcycle tire pressure), or installed on test stands. As a result, an engine can be inspected for proper balancing before the engine is sold to and operated by a consumer.

Other features and advantages of the invention will become apparent to those skilled in the art upon review of the following detailed description, claims, and drawings.

Figure 1:
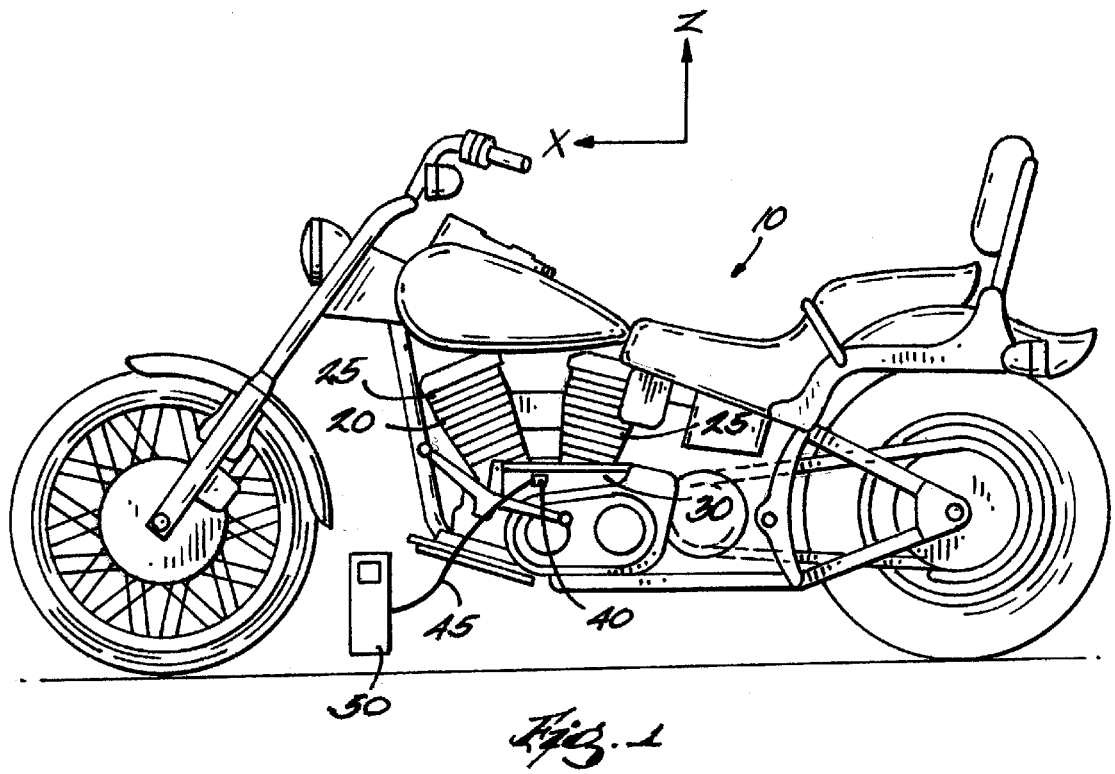
FIG. 1 is a perspective view of a motorcycle engine embodying the invention, shown mounted in a motorcycle.

Before one embodiment of the invention is explained in detail, it is to be understood that the invention is not limited in its application to the details of construction and the arrangements of the components set forth in the following description or illustrated in the drawings. The invention is capable of other embodiments and of being practiced or being carried out in various ways. Also, it is understood that the phraseology and terminology used herein is for the purpose of description and should not be regarded as limiting. The use of "including" and "comprising" and variations thereof herein is meant to encompass the items listed thereafter and equivalents thereof as well as additional items.

DETAILED DESCRIPTION OF THE PREFERRED EMBODIMENTS

An apparatus embodying the invention is illustrated in FIG. 1. The method and apparatus described herein may be used with any type of motor vehicle engine. An application of the invention in a motorcycle is illustrated for exemplary purposes.

FIG. 1 illustrates a motorcycle 10 including an engine 20. The engine 20 is mounted within the motorcycle 10 by standard methods and is designed to provide power to the motorcycle 10. The engine 20 includes two cylinders 25 connected to a crankcase 30. The engine 20 includes a balancer (not shown) designed to reduce engine vibration. The balancer includes a chain coupled to the crankshaft by a chain and a gear. If the balancer chain is misaligned by one or more teeth, the balancer can create unwanted vibrations in the engine 20. The invention described herein is designed to detect this type of balancer misalignment.

A sensor 40 is removably attached to the engine 20 in the vicinity of the crankcase 30. The sensor 40 is a motion sensor or a vibration sensor, and can specifically be an accelerometer or any suitable device that senses movement (e.g., a position sensor). It has been found that the type of accelerometer used for balancer testing is not critical, as long as the accelerometer frequency range is up to 100 Hz or above. The sensor 40 is preferably a B&K 4384 accelerometer, but may be replaced by any suitable accelerometer. The sensor measures up-and-down motion (i.e., the z-direction on FIG. 1).

Preferably, the accelerometer is placed as close to the engine rotation center as possible to avoid detecting torsional vibration. Normally, the rotation center is the same as the geometric center. In the testing performed in association with this invention, the accelerometer was placed on the top of the crankcase on the primary cover side. This location is easily accessed and is a less harmful environment for the hand. The accuracy of the sensor 40 is relatively insensitive to the method of attachment to the engine 20. The sensor 40 is preferably hand-held or attached using putty or glue, but may be attached by any suitable method including a mechanical fastener. The sensor 40 includes a wire 45 electrically connected to the sensor 40 at one end of the wire 45.

A meter 50 is electrically connected to the other end of the wire 45. The illustrated meter 50 is a meter of standard design and is programmed to interpret the signals from the sensor 40 and to make the calculations described below. The meter 50 is preferably a RION SA-77 FFT analyzer, but may be a Harley-Davidson engine balancer service tool or any other suitable device in alternate embodiments.

In operation, the engine 20 is operated in an neutral gear at a pre-selected engine speed, typically 2000±200 RPM, creating certain vibrations inherent in the operation of the engine 20. These vibrations have frequencies and levels dependent on the structure of the engine 20 and its surroundings. First-order and second-order vibrations of the engine 20 are largely attributable both to the engine 20 itself and to the system in which the engine 20 resides, in this case a motorcycle 10 (FIG. 1).

Figure 3:
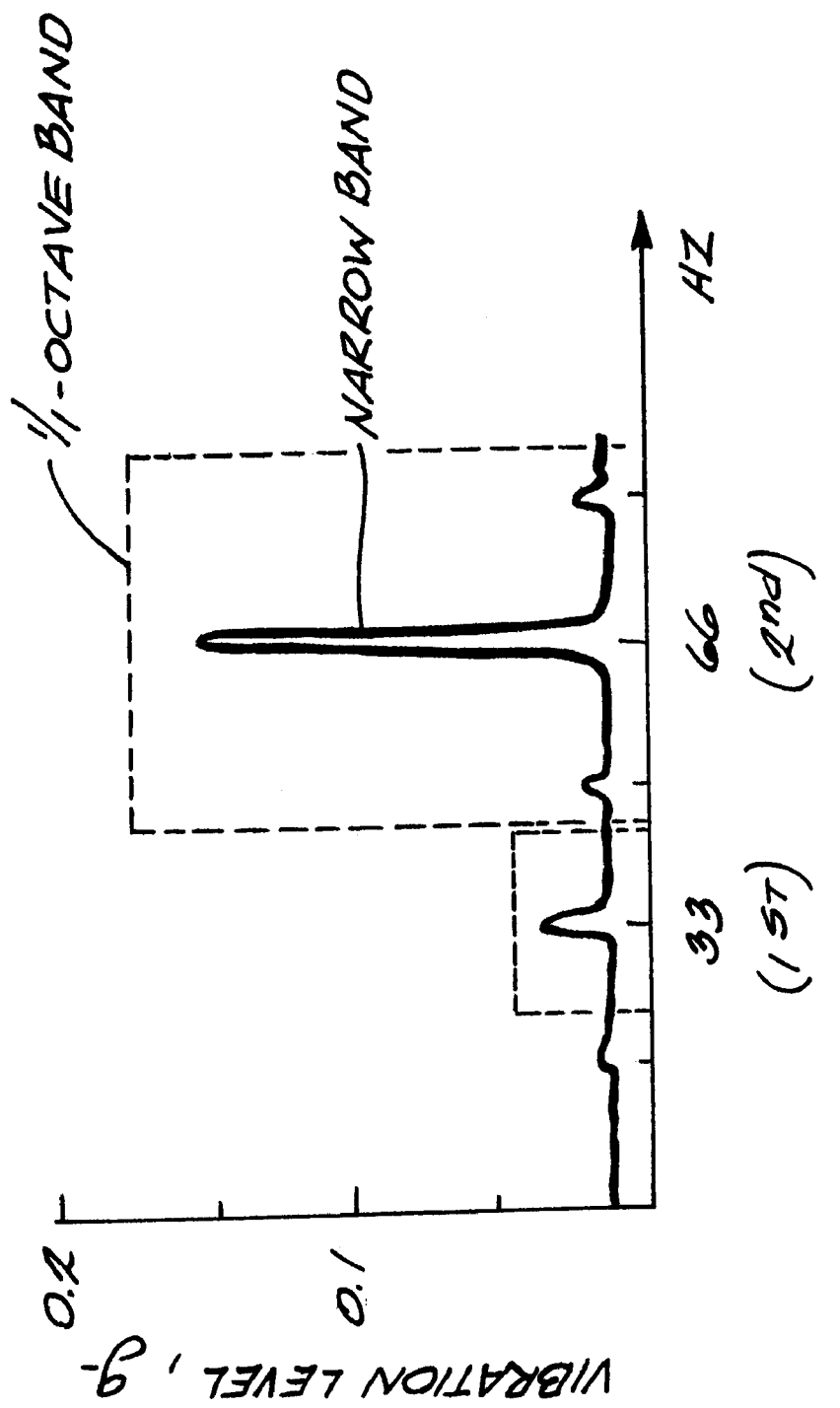
FIG. 3 is a graphical view of the narrow-band spectrum of the vibrational response of the engine illustrated in FIG. 1 when operated at 2000 rpm.

Vibrations are detected by the sensor 40, which generates a signal and transmits the signal over the wire 45 to the meter 50. The meter 50 detects the signal and processes the signal to determine the level and frequency of the first- and second-order vibrations. A typical frequency response is illustrated in FIG. 3.

Figure 2:
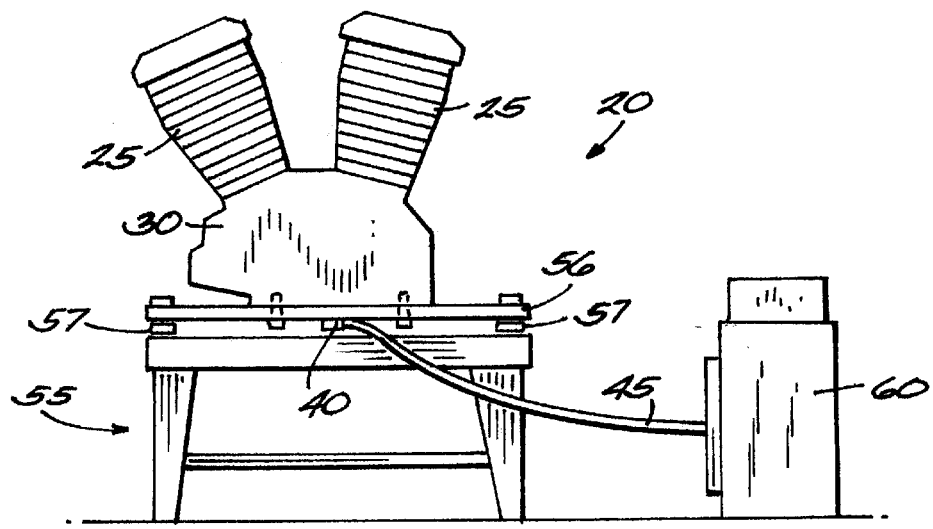
FIG. 2 is a perspective view of the motorcycle engine illustrated in FIG. 1 shown mounted on a test stand.

The engine 20 may also be tested when mounted on a test stand 55, as illustrated in FIG. 2, rather than when mounted on a motorcycle 10. The sensor 40 is permanently mounted underneath the test bed 56, which is supported by four rubber isolators 57 (see FIG. 2). Mounting the sensor 40 on the test bed 56 can save an operator time by not requiring a sensor 40 to be installed on the engine 20. The sensor 40 is electrically connected by a wire 45 to a production monitoring system 60.

The meter 50 or the production monitoring system 60 calculates the ratio of first-order to second-order vibration accelerations. This ratio is then compared using a comparator within the meter 50 or the production monitoring system 60 to a reference ratio or predetermined value that is representative of a well-balanced engine 20. Theory and testing have shown the reference ratio to be between about 0.4 and about 0.5, and the preferred reference ratio being approximately 0.45. If the calculated ratio is greater than the reference ratio, then the engine 20 needs to be re-balanced. If the calculated ratio is less than the reference ratio, then the test engine 20 is properly balanced. Testing has shown that the ranges of ratios are typically 0.1–0.3 for a properly aligned balancer, 0.5–1.0 for a balancer misaligned by one tooth, 1.0–1.8 for a balancer misaligned by two teeth, and 2.2–3.7 for a balancer misaligned by four teeth. In an alternate embodiment, a person can calculate the ratio and compare the ratio to a reference ratio. In an alternate embodiment, an order-tracking device may be used to obtain a better prediction by running up the engine, for example, from 1800 to 4200 rpm and then calculating the averaged ratio. The tracking device itself, however, and the set-up time for the device are costly. By using this run-up method, the ratios will converge to 0.20–0.3, 0.7–0.9, 1.4–1.6, and 2.5–2.6 for a balancer misaligned by zero, one, two, and four teeth, respectively.

The basis for this ratio method enables the determination of engine balancer condition. For a first-order balancer, the first-order vibration level depends on the shaking force derived from the balancer's condition and the system's characteristics (i.e., the mass and stiffness of the motorcycle's structure). However, other vibration levels such as the second-order vibration are primarily dependent on the system's characteristics. To eliminate the influence of the system's characteristics and isolate the balancer's condition, the relative vibration level, or vibration ratio, $\gamma$, is used to determine the balancer's condition rather than using the absolute level of the first-order vibration. For a balanced engine 20 on a very soft system (one in which the first system resonant frequency is lower than 15 Hz), the ratio, $\gamma$, is nearly independent of the variations of the system characteristics and only depends on the balancer's condition. These system variations could be from different tires, which are a variation of stiffness, different models of motorcycles, which are a variation of mass, or an engine 20 mounted on a test bench 55, which provides variations of both mass and stiffness. Thus, the same ratio method can be used in many different situations.

Using this basis, a method is developed to determine the balancer's condition in a balanced engine 20. The method includes measuring the first-order and second-order vibration accelerations at a pre-selected engine speed, preferably 2000±200 RPM. The ratio, $\gamma$, is then calculated, where $\gamma$ equals the level of the first-order vibrations divided by the level of the second-order vibrations. The frequencies of the first- and second-orders for an engine 20 operating at 2,000 RPM are 33 Hz and 66 Hz, respectively. Because the engine speed is not always constant, it is necessary to measure the vibration level by using the 1/1-octave band spectrum rather than using the narrow band spectrum. Two 1/1-octave band filters can allow an accurate measurement of the first- and second-order levels. The center frequencies of these two filters are 31.5 hertz and 63 hertz per ANSI S1.11-1986. A first-order balancer is designed to cancel the first-order vibration only and can not influence the vibration level of any other order. The inverse of the ratio may also be used, i.e., the ratio of the level of the second-order vibrations to the level of the first-order vibrations. In addition, other factors, including multipliers and coefficients, may be included in the ratio calculation within the scope of this invention.

Various features of the invention are set forth in the following claims.

What is claimed is:

1. A balancer tester for an internal combustion engine equipped with a balancer and having a rotating crankshaft, the balancer tester comprising:

a sensor coupled to the engine, wherein the engine generates first-order vibrations having a frequency substantially equal to the rotational frequency of the crankshaft, and second-order vibrations, the first- and second-order vibrations having vibration levels, and wherein the sensor generates a signal corresponding to the vibrations;

a meter coupled to the sensor for receiving the signal, the meter calculating a ratio between the vibration level of the first-order vibrations and the vibration level of the second-order vibrations; and a comparator that compares the ratio to a predetermined value to assess whether the engine is properly balanced.

2. The tester of claim 1, wherein the engine is mounted in a motorcycle.

3. The tester of claim 1, wherein the engine is mounted on a test stand.

4. The tester of claim 1, wherein the engine is properly balanced if the ratio is less than the predetermined value.

5. The tester of claim 1, wherein the engine is not properly balanced if the ratio is greater than the predetermined value.

6. The tester of claim 1, wherein the predetermined value is between about 0.4 and about 0.5.

7. A method for determining whether an internal combustion engine equipped with a balancer and having a rotating crankshaft is properly balanced, the method comprising the acts of:

coupling a sensor to the engine such that the sensor generates a signal corresponding with vibration of the engine;

operating the engine to rotate the crankshaft at a rotational frequency;

generating engine vibrations in response to rotation of the crankshaft, the engine vibrations having vibration frequencies and vibration levels;

receiving and interpreting the signal;

determining the vibration level of first-order engine vibrations having a vibration frequency substantially equal to the rotational frequency;

determining the vibration level of second-order engine vibrations;

calculating a ratio between the vibration level of the first-order vibrations and the vibration level of the second-order vibrations; and comparing the ratio to a predetermined value to assess whether the engine is properly balanced.

8. The method of claim 7, further comprising mounting the engine in a motorcycle.

9. The method of claim 7, further comprising mounting the engine on a test stand.

10. The method of claim 7, wherein the comparing act indicates that the engine is properly balanced if the ratio is less than the predetermined value.

11. The method of claim 7, wherein the comparing act indicates that the engine is not properly balanced if the ratio is greater than the predetermined value.

12. The method of claim 7, wherein the receiving act uses two 1/1-octave band filters to receive the vibration levels.

13. The method of claim 7, wherein the predetermined value is between about 0.4 and about 0.5.

* * * * *